(No Model.)
W. R. WHITE.
SEED PLANTER.
No. 283,178. Patented Aug. 14, 1883.
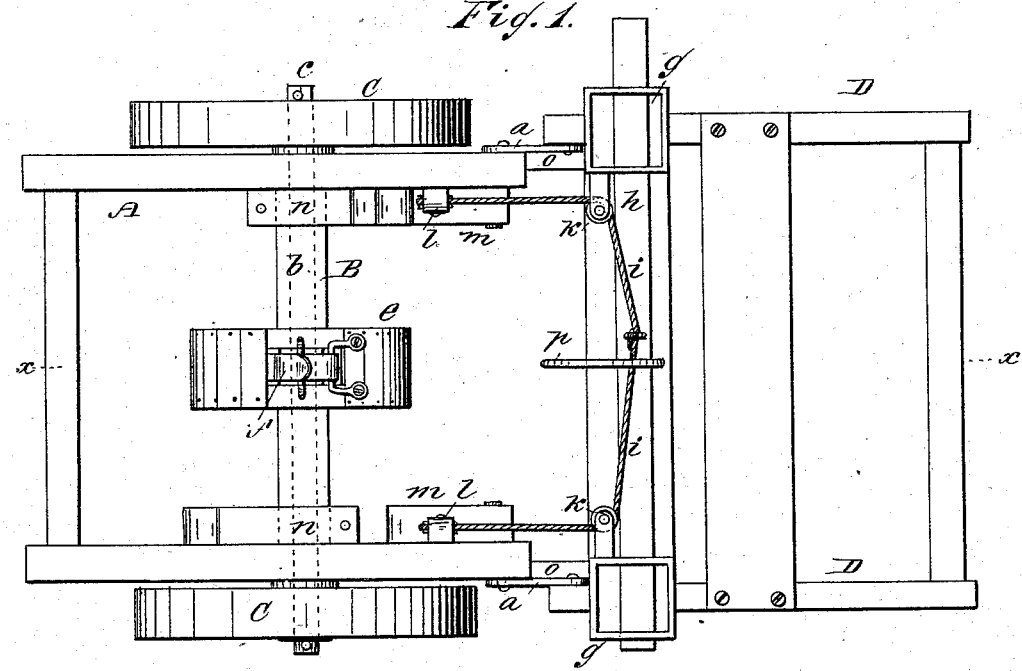
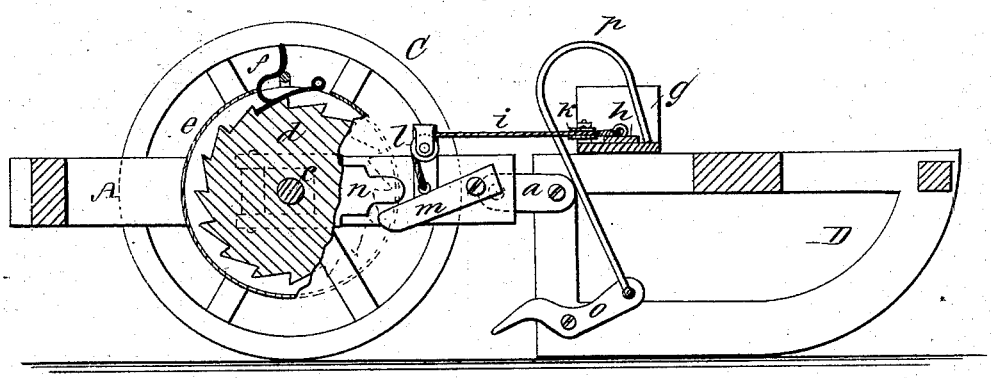
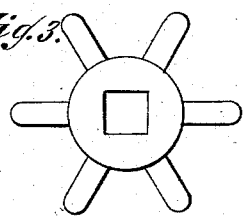
WITNESSES:
Theo. G. Hoster
C. Sedgwick
INVENTOR:
W. R. White
BY Munn &Co
ATTORNEYS.

UNITED STATES PATENT OFFICE.

WILLIAM R. WHITE, OF AURORA, NEBRASKA.

SEED-PLANTER.

SPECIFICATION forming part of Letters Patent No. 283,178, dated August 14, 1883.

Application filed October 11, 1882. (No model.)

*To all whom it may concern:*

Be it known that I, WILLIAM R. WHITE, of Aurora, in the county of Hamilton and State of Nebraska, have invented a new and Improved Seed-Planter, of which the following is a full, clear, and exact description.

My improvements relate to machines for planting corn and other seed in hills, or by drilling in rows; and the invention consists in certain novel devices for operating the feed-slide, and also in other parts of the machine, as hereinafter described and claimed.

Reference is to be had to the accompanying drawings, forming a part of this specification, in which similar letters of reference indicate corresponding parts in all the figures.

Figure 1 is a plan view of my machine. Fig. 2 is a sectional side view on line $x\,x$, Fig. 1. Fig. 3 represents a modification of the device for moving the feed-slide.

A is the main frame of the machine, supported on an axle, B, and wheels C C. D D are the shoes for marking the rows, connected together and attached to the main frame A by links $a$.

The axle B is made in two portions, an outer tubular portion, $b$, between the sides of the frame A, and an inner portion, $c$, upon which one wheel is fixed, while the other wheel is loose. At the mid-length of the axle the inner portion, $c$, is provided with a ratchet-wheel, $d$, which is covered by a box, $e$, attached to and between the ends of the tubular portion $b$ of the axle. On the upper side of the box $e$ is hung a lever or pawl, $f$, which projects through an aperture in the box and engages the ratchet-wheel, so that when the inner axle, $c$, is turned in the forward direction the box $e$ and the outer axle will be turned with it, while the axle $c$ may turn independently in the other direction to facilitate the turning of the machine at the end of the row.

$g\,g$ are the seed-boxes, fitted on the forward part of the machine, provided with the dropping-slide $h$, of the usual construction.

$i$ is a cord connected at the mid-length of the slide $h$, and passing in opposite directions over guide-rollers $k\,l$ to the rear, and having its ends connected to arms $m$, that are pivoted to the side bars of the frame A in front of the axle B.

Upon the outer portion, $b$, of the axle are attached two arms or knockers $n$, projecting at opposite sides of the axle into position for coming in contact with the pivoted arms $m$, to which the cords are connected, so that in the revolution of the axle the knockers $n$ strike and press down the arms $m$ alternately, each arm $m$ being thus operated at every revolution of the axle, and the feed-slide thus shifted by the draft of the arms $m$ upon the cord.

The wheels C may be proportioned according to the distance apart that it is desired to make the hills of corn, and if they are to be placed close together the arms $n$ may be formed to project at both sides, so as to move the feed-slide at every quarter-revolution of the axle. For drilling, a wheel such as is shown in Fig. 3, provided with six or more arms, may be substituted for each of the arms $n$, and these wheels will cause an almost continuous opening of the seed-boxes.

It is usually desirable to mark the end of a row where the last hill is dropped. For that purpose I provide the pivoted blocks $o$, which are attached upon the inner sides of the shoes D, and to these blocks is connected a lever, $p$, that extends upward in front of the machine in a convenient position for operation. The lever $p$ is to be raised just as the last hill is to be dropped, and that action will force the ends of the blocks $o$ downward into the ground, thereby making a mark indicating the point in the row at which the planting ceases.

Having thus described my invention, I claim as new and desire to secure by Letters Patent—

1. In seed-planters, the two-part axle $b\,c$, the supporting-wheels C C, one of which is fixed on the portion $c$ of the axle, the ratchet-wheel $d$, and pawl $f$, substantially as described, combined with the main frame A of the machine for operation as set forth.

2. In seed-planters, the combination of the inner axle, $c$, the outer axle, $b$, the ratchet-wheel $d$, the pawl $f$, and the arms $n$, attached to the outer axle and arranged to operate the feed-slide of the seed-boxes, substantially as shown and described.

3. In a seed-planter, the combination, with the shoe D and seed-dropping mechanism, of the pivoted blocks $o$, with a rearwardly and downwardly projecting extension and the inverted J-shaped lever $p$, as shown and described, and for the purpose set forth.

WILLIAM R. WHITE.

Witnesses:
ROBERT A. WHITE,
FREDERICK J. BRICKER.